(12) United States Patent
Skyum et al.

(10) Patent No.: US 6,408,223 B1
(45) Date of Patent: Jun. 18, 2002

(54) WEIGHING SYSTEM OF THE DYNAMIC TYPE

(75) Inventors: Henrik F. Skyum, Skanderborg; Ulrich Carlin Nielsen, Ry, both of (DK)

(73) Assignee: Scanvaegt International A/S, Arhus N (DK)

( * ) Notice: Subject to any disclaimer, the term of this patent is extended or adjusted under 35 U.S.C. 154(b) by 0 days.

(21) Appl. No.: 09/582,219

(22) PCT Filed: Jan. 27, 1999

(86) PCT No.: PCT/DK99/00038

§ 371 (c)(1),
(2), (4) Date: Jul. 20, 2000

(87) PCT Pub. No.: WO99/37977

PCT Pub. Date: Jul. 29, 1999

(30) Foreign Application Priority Data

Jan. 27, 1998 (DK) .......................... 1998 00103

(51) Int. Cl.⁷ ..................... G06F 7/00; G01G 13/00; G01G 19/32
(52) U.S. Cl. ............... 700/213; 177/25.18; 177/119; 177/145
(58) Field of Search ............... 700/213; 177/25.11, 177/25.13, 119, 145, 25.18

(56) References Cited

U.S. PATENT DOCUMENTS

| | | | | |
|---|---|---|---|---|
| 3,978,987 A | * | 9/1976 | Neville et al. | 209/576 X |
| 4,308,928 A | * | 1/1982 | Oshima | 177/25.18 X |
| 4,709,770 A | | 12/1987 | Kohashi et al. | |
| 5,308,930 A | * | 5/1994 | Tokutu et al. | 177/25.13 X |
| 5,724,874 A | * | 3/1998 | Lindee et al. | 83/27 X |
| 5,753,792 A | * | 5/1998 | Olson | 177/25.18 X |
| 5,814,772 A | * | 9/1998 | Nishimura et al. | 177/145 X |
| 5,990,422 A | * | 11/1999 | Komori et al. | 177/25.11 X |

FOREIGN PATENT DOCUMENTS

| | | |
|---|---|---|
| GB | 2 116 732 | 9/1983 |
| WO | WO 9608322 | 3/1996 |

* cited by examiner

Primary Examiner—Christopher P. Ellis
Assistant Examiner—Gene O. Crawford
(74) Attorney, Agent, or Firm—Nixon Peabody LLP; David S. Safran

(57) ABSTRACT

For a weight controlled building up of batches of foodstuff pieces, the pieces are supplied serially with mutual spacing and are weighed-in on a dynamic weigher using a "single weighing algorithm". Quite similar weighers are known operating for "summation or flow weighing", which does not require the supplied pieces to be supplied one by one while making use of a special algorithm. With the invention these technics are combined with the aim of handling an unorderly supply flow, in which there are both separated and non-separated pieces, in that by means of a detector it is determined whether the pieces are sufficiently separated for being "single weighed" for batching purposes, while the pieces will otherwise be flow weighed e.g. for the formation of large batches. One and same weigher may be used in both instances, inasfar as based on the said detection it is currently decided whether the weighing signal should be processed in accordance with one algorithm or the other, all according to what is most suitable in the actual operational situations.

12 Claims, 1 Drawing Sheet

WEIGHING SYSTEM OF THE DYNAMIC TYPE

Figure 1:
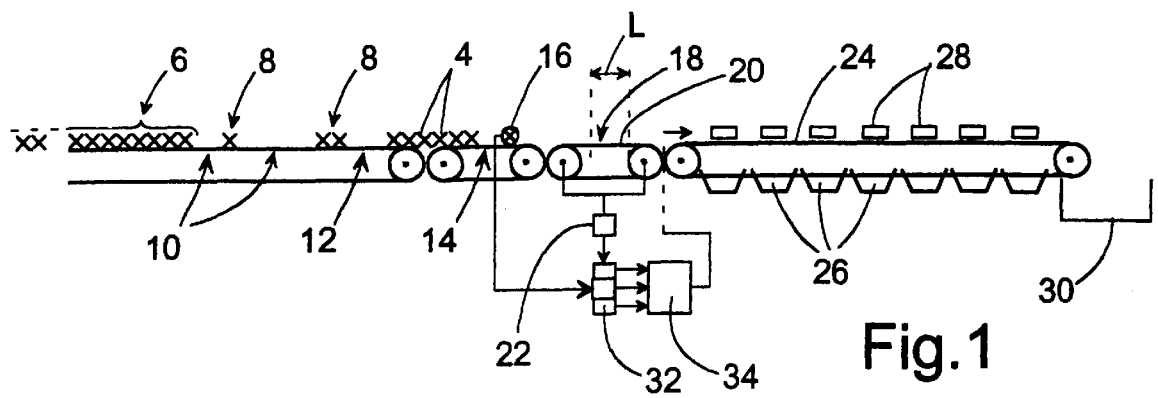

The present invention concerns a weighing apparatus of the through-flow type, typically with a dynamic weighing system with a weighing belt introduced between an in-coming and an out-going conveyor belt.

Such an apparatus is used in various connections, e.g. for single weighing or batch weighing, where individual items are fed with mutual distance between them, so that the weight of these items, which are shorter than the weighing belt, can be determined for subsequent distribution to selected receiving stations arranged along and at the side of the out-going conveyor belt. With so-called graders, this is effected in a computer-controlled manner, in that the object here is to build up portions with pre-determined weight in the receiving stations. For this purpose, quite advanced control algorithms based on probability calculations have been developed for the batching of the items with high efficiency. It is precisely when the items pass the weighing belt individually that a weight determination with good accuracy can be achieved, so that also the total weight of a number of batched items can display good weighing accuracy.

It shall be mentioned that apparatus is also known for through-flow weighing of an irregular or even tight item flow, which can be transported further direct to summation-weighed batches in successively arranged collection containers, whereby no demands are made regarding the carrying out of a separation before the batching of the items in the individual batch containers, neither of the weighed part-portions in combination weight nor items conveyed to the grader's dynamic weighing system. Such a summation weighing is called "flow weighing", and it can be effected by means of a dynamic weighing system which, from the point of view of mechanics, can be of quite the same type as the grader's weighing units, i.e. a simple weighing belt which can determine the weight load on a belt of a given length. With flow-weighing, a summation is determined of the load on this belt length in close correlation with the speed at which the belt is driven, while with "grader weighing"" the weight of the isolated item is determined, i.e. of the item which is currently lying on this belt length, and regardless of the speed of the belt, but consequently with demands concerning item separation, so that only a single item at a time can appear along the whole length of the weighing belt, possibly a number of items grouped closely together, which shall thus merely have the necessary distance from and to the neighbouring items or—the item groups in the item flow and of the necessarily small extent to be able to give the illusion of a single item in this flow. In both cases, the weighing equipment itself can consist of a weighing cell which constantly provides an expression for the loading on the weighing belt, but in both cases the signals arising from the weighing must be processed very differently, e.g. because with the flow measurement regard must already be paid to the speed of the belt. In principle, this is no importance for the weighing of separate individual items, but on the other hand rather for the extent of the required separation.

The invention is based on the observation that with many deliveries of items in a flow, for example when introduced from a truck to a delivery belt in a weighing plant, there arises such an uneven item distribution that this involves constant sequences with a character of respectively continuous item flow and mutually separated items or closely arranged item groups. In accordance with the known technique, care must hereby be taken that the item flow is either or preferably evened out to a uniform flow of which the weight can be determined in accordance with the flow principle, or on the other hand divided into distinct, mutually separated item units for individual weighing in accordance with the "grader principle". The question of whether the one or the other should be implemented will thus depend on whether the supply of items shall be effected for flow weighing or for grader weighing.

With the invention it has been realised that it is possible to carry out a kind of integration of these techniques based precisely on the fact that the mechanical weighing equipment can be the same for them both. Whether the equipment shall thus serve as a flow weighing system or item weighing system will solely be a question concerning a replacement between respective units for the processing of the weighing signals. Since it is desired to work with item portioning, the apparatus equipment must naturally be arranged for this purpose, i.e. with the necessary means of separation, but it is already quite common for weighing plants also to have a simple discharge end for the delivery of items which have not been selected for any of the collection containers, so that these plants will be directly suitable also for the delivery of a flow of item which have been flow-weighed, merely when this has been made possible by expedient adaptation of the weighing algorithms which are used.

Consequently, a grader can also hereby be chosen to serve either as a grader or for flow weighing, but moreover with the possibility that this choice can be made in a current or dynamic manner, i.e. in the case discussed where an arriving flow of items changes in an irregular, or for that matter regular fashion, between being a full flow and a flow of separated individual items. This can be detected using simple means, e.g. by use of fixed photo-cells, insofar that just before the arrival at the weighing belt, items or item groups appear which have both a suitably short length and a suitably short distance from the last preceding item and the next subsequent item, so that the weighing unit can accept to weigh this item or this group as a single item, which can then be handled in the grader system, while items or item groups which do not fulfil the said conditions are conveyed further for flow-weighing and for collection at the discharge end of the grader. During periods or sequences with flow-weighing it will be possible to increase the belt velocity.

The actual detection of the item distribution need not take place immediately before the feeding of the items to the weighing belt, in that with its knowledge of the belt speed the control computer will know when the scanned area will reach forward to the weighing belt. As mentioned, the scanning can be effected with means other than a photocell, e.g. a vision camera or a preceding, short weighing belt. It will also be a possibility for use to be made of the operative weighing cell itself for the scanning, in that e.g. via this it can be detected whether an arriving load has the character of a small article, which after entry on the weighing belt does not give rise to further weight increase on the belt, or whether it is a long article which when departing from the weighing belt at its leading end has not yet manifested itself by a stabilising of the weight loading of the belt.

Within the weighing technique there is a tendency for the hitherto quite clear concepts such as "single weighing" and "flow weighing" to become less clear, in that what is involved is rather the use of algorithms which are optimised for the task which is to be solved. Therefore, in a slightly broader sense the invention is to be understood in that way that under varying conditions, a determination is made of which type of task is currently relevant, and an associated selection of which of several pre-programmed algorithms are to be preferred in the solving of the task detected.

It must be mentioned that in any case there will be a theoretical possibility for the determination of the type of task to be effected by the passage of the weighing belt itself, in that the associated signals from the weighing cell can be subjected to very quick signal analysis, and moreover stored until it is decided by this analysis which algorithm will be most suitable for the purpose. Thereafter, the stored signal sequence can be retrieved for processing by the selected algorithm, and there will hereby even be the possibility of a certain integration of the signal processing. Since this can be carried out with electronic speed, the related delay in the arrival of the weighing result will be quite modest, so that a given item in such a case can already be led out to the first of the grader's receiving stations.

Purely from the apparatus point of view, the grader can be supplemented with equipment for the automatic changing of the receiving container for flow-weighed portions.

It must be mentioned that from the plant and capacity point of view, the invention offers the advantage that a given handling line can be better arranged for the handling of the most commonly-appearing sizes of the articles, e.g. fish, and still however also allow the passage and weighing of "overlong" articles which appear now and then, with the view to either the formation of portions or "flow collection". This makes it possible for use to be made of a weighing belt of quite modest length.

It will thus be a possibility for both or a number of weighing algorithms to be brought into use when the circumstances call for it, regardless of whether it is a batch weighing or a flow weighing which is given the highest priority.

Figure 2:
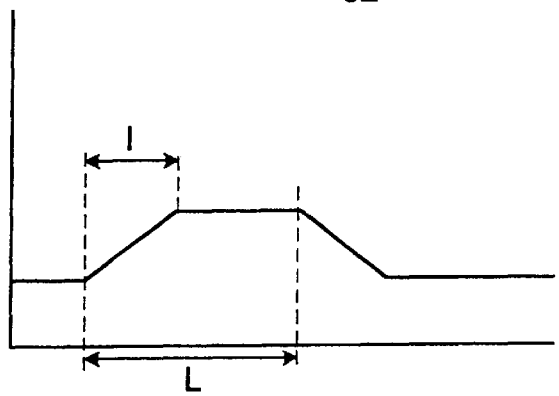
Figure 3:
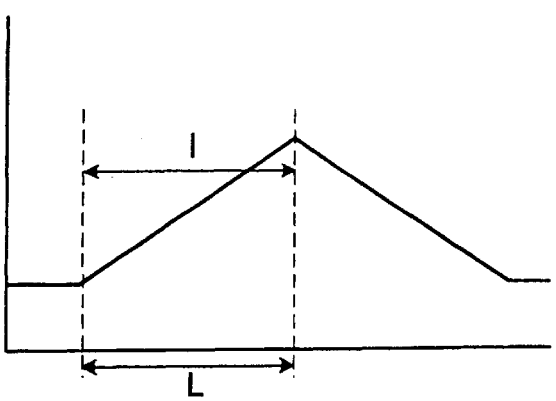
Figure 4:
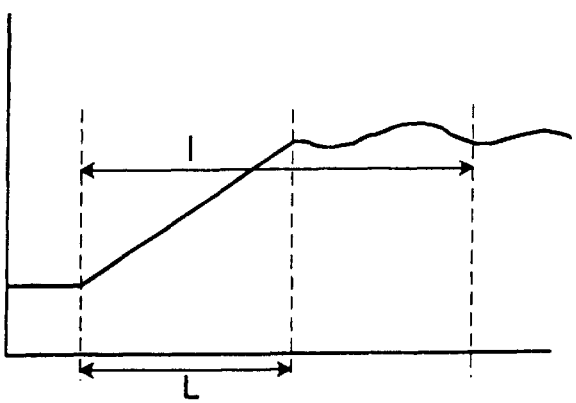

In the following, the invention is described in more detail with reference to the drawing, in which FIG. 1 is a schematic side view of a weighing plant according to the invention, and FIGS. 2–4 are graphs which show the weighing signal in different situations.

In FIG. 1 there is shown a weighing plant with an incoming conveyor belt 2 on which a flow of items 4 is conveyed, which as shown can be expected to appear in an irregular manner, i.e. partly in "long" sequences 6 and partly in short sequences 8 separated by long distances 10 or separated by "short" distances 12. The items continue to a conveyor section 14 at which a sensor 16 is placed, such as a photo-cell, for the detection respectively of the duration of the interruptions 10 or 12 which arise in the item flow, and the part-lengths 6, 8 of the items which constitute this flow, which is easily detectable when the speed of the belt is known.

Thereafter, the flow of items passes over a dynamic weighing station 18 with a weighing belt 20 which has an effective length L, and with an associated weighing cell 22 which detects the weight of the item arriving on the belt 20.

The weighing belt 20 extends up to a longer conveyor belt 24, along which and at the one or both sides of which a series of receiving stations 26 are placed, which can be containers for the accommodation of batches of items, or ends of out-going conveyor belts for the leading-away of items, while above the belt 24 there is arranged a corresponding series of sweeping-off elements 28 which can be activated in a selective manner for the allotment of the items on the belt to the different receiving stations 26. At the end of the belt 24 there is a collection station 30 which can similarly be a container or e.g. a conveyor belt running at an angle away from the plant.

The weighing cell 22 delivers its weighing signal to a control unit 32 which also receives the detection signal from the sensor 16, and which on the basis of the detection signal received is arranged to calculate which of the weighing algorithms will be most suitable for the weighing/separating-out of the items 4 passing on the weighing belt 20. A distinction shall thus be made between different main types of situations, namely the following:

A) The items arriving at the weighing belt consist of a flow or part-flow (6) of items 4 which are arranged closely together, and which is longer than the effective length L of the weighing belt. In this case, the sensor 16 and the weighing belt will conceive these items as a "simple continuous" item flow, and in this situation the control unit 32 will decide that a weighing computer 34 shall work in accordance with a more-or-less conventional "flow-weighing or summation-weighing" algorithm. In that an object of the invention is to be able to make use of a weighing belt of relatively short length, it will undoubtedly occur that an "overlong" item group or even an overlong item will be suitable for sorting-out or batch weighing, but otherwise such overlong formations will be guided direct to the summated weight indication for the collection station 30, or possibly to one or more side-placed receiving stations. In the calculation of the weight, it will thus be taken into consideration that during the passage of the item flow on the weighing belt 20, varying item weights can appear and herewith also a varying weight loading on the whole of the operative belt length L. This leads to the consideration of the next main type:

B) The sensor 16 detects that there is a "short interruption" 12 in the item flow, which is shorter than the belt length L. Normally, this will not necessitate any changes in the working mode of the apparatus, in that this should continue to be in accordance with the summation principle, regardless of whether one or more parts of the item flow contribute with a zero weighing result.

C) The sensor 16 detects that the interruption (10) in the item flow is so long that it exceeds the belt length L in connection with the passage of a "short" item. On the basis of a completely different and quite well-known algorithm, it will hereby be possible for the weighing unit 20, 22 to determine the "single weight" of the passing item, regardless of whether this consists of a single or several items. The weighing computer 34 can here with be influenced to remain operative, also in so far as an activation of the sweeping-off elements 28 is concerned, i.e. the apparatus can now work as a sorting-out or batching apparatus, all depending on on the registered weight of the passing items or closely-arranged groups of items.

D) There can arise a further main case, i.e. that an item or a part-flow is detected to be about the same length as the length L. There can hereby arise a degree of uncertainty concerning the result of the "single weighing", but there is nothing to prevent work from being carried out with the summations-weight algorithm at the same time, just as on the whole it will be possible to subject the weighing signal to different forms of signal analysis, including also with regard to the slope of the rising phase of the weighing signal, which can be a valuable contribution in the estimation of the weighing result, which can thus be arrived at by an averaging of or a weighted evaluation of the results from "single weighing", "summation weighing" and "curve-analysis weighing" respectively. A signal analysis can thus be used for a continuous evaluation of which principle or which of the different principles should be used. If the results deviate from one another, it will be possible to effect a continuous correction of the calculation parameters with starting point in clear "single weighings", i.e. with associated corrections of the remaining calculations running parallel.

When use is made of an external sensor, it is fully possible to carry out an evaluation of whether a given item can at all be a candidate for "batch weighing" already before the item reaches forward to the weighing belt, or respectively whether a continuous flow appears. By using the weighing cell as sensor, it is necessary for the weighing signal to be continuously stored in a memory until it can be decided whether the item is such a candidate, or whether a flow is involved, after which the signal processing can be initiated. In practice, it is to be preferred that use is made of information from both an external sensor and the weighing cell. In FIG. 2 there is shown the weighing signal which is generated by the passage over the weighing belt of a single item which is shorter than the belt. The abscissa refers to the position of the foremost edge of the item on the weighing belt, which is marked by the length L, while the item length is marked with I. FIG. 3 shows the same, but now for an item length equal to the length of the belt, and FIG. 4 shows the situation at I>L. As shown, here the top of the signal can be uneven as an expression of the variations which can arise in the weight-loading of the belt, whereby summation weighing must be carried out.

The signals which arise can well be quite complex, e.g. as a consequence of a new item arriving on the belt before the preceding item has managed to depart from it. However, if this happens the two items will be lying more-or-less close to each other, and it can thus possibly be decided, on the basis of a flow weighing, that the two items can be accepted as one item for collective allotment to a batch being built up. This can possibly be spoiled, however, by the next item lying so closely to the centremost item that there will not be the necessary distance to ensure the function of the sweeping-off elements in a sorting-out unit, and thus all three items must instead be sent for "flow-collection". It is possible for quite the same sequence of events to occur if the new item first arrives on the belt just after the preceding item has completely left the belt. If both items can be used en bloc, a choice can thus be made between an addition of two single weighings and a collective flow weighing.

What is claimed is:

1. Method of weighing an irregular flow of items using a dynamic system having an associated calculation unit for conversion of resulting weight signals to expressions of weight based on a relevant algorithm, said method comprising the steps of:
   using a weighing unit, which is operable on the basis of each of a plurality algorithms with which it is provided, to selective perform item weighing of individual items, item-group weighing of closely spaced groups of individual items, and collective-flow weighing of the flow of items;
   detecting the flow of items when it arrives and registering the mass distribution of the items in the flow of items, including detection of any interruptions of the flow; and
   using the results of said detecting step for selecting one of said plurality of algorithms for performing weight determinations and for determining further handling of the items, said weight distribution being used during weighing for switching between said item weighing, item-group weighing, and collective-flow weighing of the items of the flow of items.

2. Method according to claim 1, wherein the calculation unit is used as a control unit for changing of a portioning-out apparatus of the grader type between working as a grader in the case of item weighing and item-group weighing and as a single or multi line weighing arrangement in the case of collective-flow weighing.

3. Method according to claim 1, wherein the weighing signals are used as said means for detection.

4. Apparatus for weighing an irregular flow of items, comprising:
   a dynamic weighing unit having a weighing belt of a given operative length and an associated calculation unit for conversion of resulting weight signals to expressions of weight based on a relevant algorithm;
   wherein said calculation unit is programmed with a plurality algorithms for selectively perform item weighing of individual items on the weighing belt, item-group weighing of closely spaced groups of individual items on the weighing belt, and collective-flow weighing of the flow of items passing over the weighing belt; and
   detecting means for detecting interruptions in the flow of items and the length of the flow between successive interruptions;
   wherein the detecting means is connected to the calculation unit, said calculation unit selecting one of said plurality of algorithms for performing weight determinations and for determining further handling of the items, switching between algorithms for said item weighing, item-group weighing, and collective-flow weighing of the flow of items, based on detection signals received from said detecting means.

5. Apparatus for weighing according to claim 4, wherein said detecting means comprises a registration device selected from the group consisting of a photocell sensor, a weighing element and vision equipment, said registration device being located in a conveying path of the flow of items in front of an inlet to the weighing belt.

6. Apparatus for weighing according to claim 4, wherein said detecting means is associated with said calculation unit in a manner enabling continuous analysis of whether weight loads arise from "short" or "long" items or groups of items.

7. Apparatus for weighing according to claim 4, wherein said algorithms comprise algorithms for single item weighing, summation weight of plural items, and curve analysis weighing of a collective flow of items.

8. Apparatus for weighing according to claim 4, further comprising a sorting device having a conveyor belt, a series of receiving stations disposed along sides of the conveyor belt, elements for directing single items and item groups from the conveyor belt to respective ones of said series of receiving stations, a summation weigher downstream said conveyor belt, and a control unit for selective operation of said elements for leading out of items to said receiving stations and for allowing said items to continue downstream of said conveyor for summation weighing.

9. Apparatus for weighing according to claim 8, wherein said control means is responsive to detection by said by said detecting means of a group of items in said flow of a length exceeding a predetermined length, for enabling conveying of said group of items for summation weighing.

10. Apparatus for weighing according to claim 8, wherein said sorting device is of the grader type.

11. Apparatus for weighing according to claim 8, wherein said detecting means is associated with said calculation unit in a manner enabling continuous analysis of whether weight loads arise from "short" or "long" items or groups of items.

12. Apparatus for weighing according to claim 11, wherein the calculation unit is constructed to conclude said analysis sufficiently quickly to enable, in the event of an algorithm change from collective-flow weighing to item weighing, activation of said elements can be effected at the first of said receiving stations in time to receive a first item after such a change.

* * * * *